United States Patent [19]

Chromik

[11] 4,131,126
[45] Dec. 26, 1978

[54] MECHANICAL ACTUATING MEANS FOR HYDRAULIC CONTROL VALVES

[75] Inventor: Karel Chromik, Schliern, Switzerland

[73] Assignee: H. Bieri AG Liebefeld, Liebefeld/Könitz, Switzerland

[21] Appl. No.: 835,742

[22] Filed: Sep. 22, 1977

[30] Foreign Application Priority Data

Oct. 18, 1976 [DE] Fed. Rep. of Germany ....... 2646941

[51] Int. Cl.² .................. F16K 11/16; F16K 31/524
[52] U.S. Cl. .................................. 137/270; 137/636.1; 137/637.1; 251/251; 251/297
[58] Field of Search ............ 137/269, 270, 636, 636.1, 137/636.2, 637, 637.1, 867, 868, 884; 251/251, 257, 258, 259, 263

[56] References Cited

U.S. PATENT DOCUMENTS

| 2,580,553 | 1/1952 | King | 137/636.1 |
| 3,195,574 | 7/1965 | Carls | 137/625.69 |
| 3,557,828 | 1/1971 | Smith | 251/251 X |

FOREIGN PATENT DOCUMENTS

| 640177 | 4/1962 | Canada | 137/637.1 |
| 1249041 | 8/1967 | Fed. Rep. of Germany | 251/251 |
| 799228 | 8/1958 | United Kingdom | 137/868 |

*Primary Examiner*—Martin P. Schwadron
*Assistant Examiner*—Richard Gerard

[57] ABSTRACT

A mechanical actuating device for hydraulic control valves having complex control functions, which can be assembled from individual units in a modular system, each of which has valve bodies which can be operated by longitudinal displacement in a housing that can be joined to the housing of the adjacent module. The actuating device for each module has a cam control member rotatably mounted in a cam housing which can be placed on the module housing and which can be brought into engagement with the ends of the valve bodies protruding from the module housing. The cam control members of all individual modules are disposed with aligned axes of rotation, and a coupling is provided for the co-rotational joining together of the cam control members of adjacent modules in selectable relative angular positions to one another.

9 Claims, 5 Drawing Figures

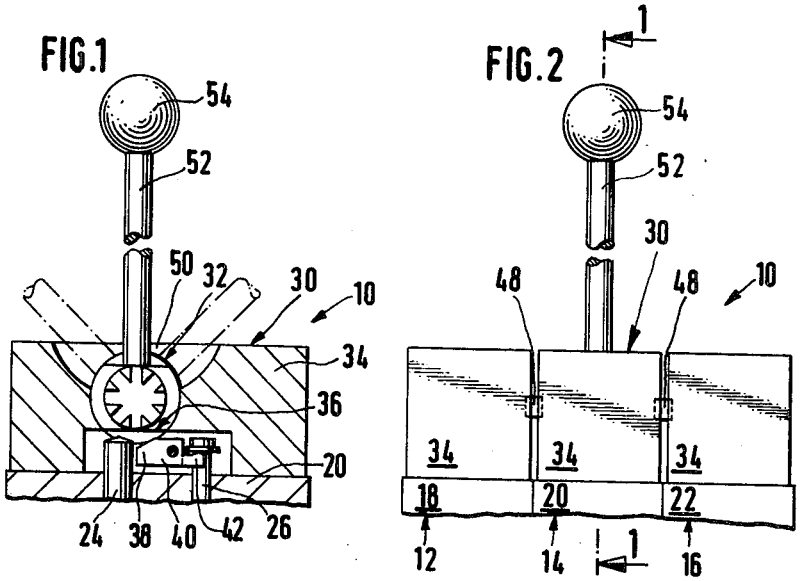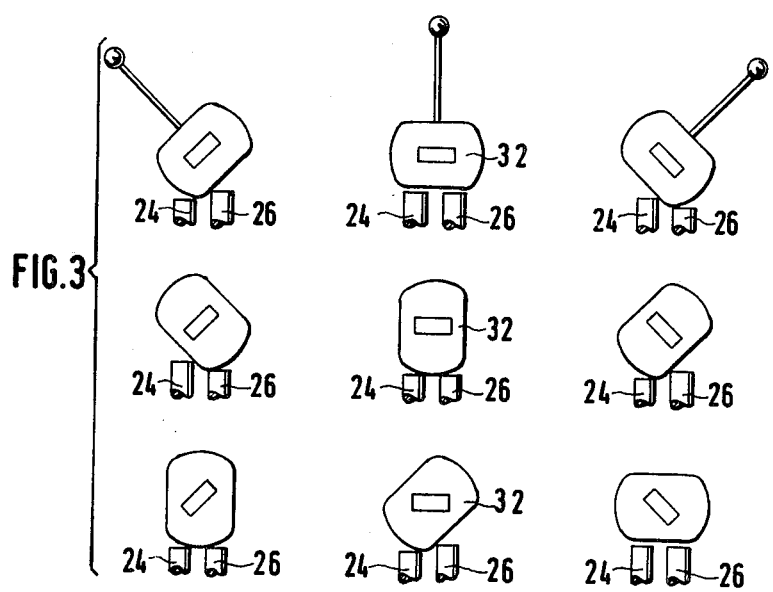

MECHANICAL ACTUATING MEANS FOR HYDRAULIC CONTROL VALVES

BACKGROUND

The invention concerns a mechanical actuating device for hydraulic control valves having complex control functions, which can be assembled from modular units, each of them having control valve bodies operated by longitudinal displacement in a housing that can be joined to the housing of the adjacent module, and by means of which passages to adjacent modules and/or external circuits are opened or closed according to the position in which they are set, the operation of the valve bodies being accomplished by mechanical action on the ends of the valve bodies which protrude from the module housings on the same side of the latter.

Control valves for hydraulic systems can have very complex functions depending on the connections which are to be established simultaneously as required in a particular operation. It can be understood that such control valves require complex valve bodies (slide valves bodies for example) and valve housings, so that the manufacturing costs for control valves of only two functions is increased all out of proportion to those of only one function. Now, it is fundamentally also possible to provide for complex control functions by an appropriate combination of single-function valves, and in practice this is often done. In order in such cases to achieve compactness the housings of the unit valves are fastened together in part directly, i.e., without the interposition of conduits, to form modular assemblies, in which case passages provided in the confronting housing surfaces provide a direct communication between the assembled valves. In order to assure the proper operation of hydraulic systems using such ganged valves, the valve bodies of the individual valves must be operated in synchronism. This is basically possible by simultaneous hydraulic operation or electromagnetic actuation, in which case, however, the hydraulic systems are additionally complicated by the required hydraulic or electromagnetic actuating systems.

THE INVENTION

The invention is aimed at solving the problem of creating a mechanical actuating means for individual modules (individual valves) designed for assembly into blocks, which will not only make possible the required synchronous operation of the individual modules, but will furthermore make it possible to execute such assembly in such a manner that the relative positions of the valve bodies of the individual modules will be selectable as desired, so that any desired control valve can be assembled from a few simply constructed modules for varied and complex functions.

Setting out from an actuating means of the kind described in the beginning, this problem is solved in accordance with the invention in that the actuating means for each module has a control cam which is rotatably mounted in a cam housing designed for installation on the module housing and which can be brought into engagement with the ends of the control valve bodies projecting from the module housing, that the control cams of all of the individual modules are disposed with their axes of rotation in line, and that in each case a coupling is provided for ganging together the cam control members of adjacent modules in selectable positions relative to one another. By the ganging together of the cam control members of the individual modules disposed with their axes in line, the synchronous actuation of all of the modules assembled into one operating unit is assured, while the possibility of fixing the cam control member in selectable angular positions relative to one another makes it possible to gang together individual modules having different functions, and hence permits the assembly, from similar individual modules, of control valves of different functions.

The cam control members of the individual modules are preferably so designed that each cam control member has in its middle a cam section engaging, in a manner depending on its position, the ends of the valve bodies protruding from the module, and having laterally adjoining journal sections of circular cross section for rotatable mounting in the cam housing. Since each cam control member is thus journaled directly beside the cam section, the journal clearances of the cam control members cannot add to one another, so that a precise response of the valve bodies of each individual module is assured.

In order to hold the cam control members of the modules assembled into a functional unit securely in their actuating positions, provision is made in an advantageous further development of the invention so that a detent body biased resiliently towards one journal section of the cam control member is displaceably mounted in the cam housing of at least one of the ganged modules, and that the cam control member has a detent recess in each of its areas opposite the detent body when it is in the actuating positions.

In a preferred embodiment of the invention, there is provided in the cam housing of one of a series of modules joined together in a block a slot extending at right angles to the axis of rotation of the cam control member, and a control lever projecting from the cam housing passes through this slot, the length and shape of the slot being so dimensioned in the end area that the cam control member can be rotated by means of the lever to the required control position. Since the cam control members are joined together co-rotationally in the direction of operation thereof, the control lever can be provided on any desired individual module.

It is possible to arrange two or more actuating levers on remote modules of the same block, if this is desirable for reasons of convenience of operation.

The coupling which joins the cam control members of adjacent modules for co-rotation is formed in a preferred embodiment of the invention by grooves created in the confronting end faces of the adjacent cam control members, into which there can be inserted a key bridging the interval between them.

In this case the design is preferably such that a plurality of angularly offset grooves are provided in the end faces of the cam control members, depending on the number of the control positions, in an angularly offset arrangement in the cam housing corresponding to the relative angular control positions of the cam control members. Thus, if the control means is designed for a two-position control valve in which the cam control members perform a 90° rotatory movement in the shift from the one to the other control position, two grooves extending at right angles to one another and intersecting on the axis of rotation of the corresponding cam control member are provided in the end faces of adjacent cam control members. If the control means is designed, however, for a three-position control valve in which the cam control members perform a rotatory movement of 90° in the shift from the one end control position through the middle control position to the other end control position, a total of four grooves offset by a 45° angle from one another and intersecting at the axis of rotation of the corresponding cam control member are provided in the end faces of adjacent cam control members.

Fundamentally, therefore, the angular offset of the grooves will correspond precisely to the shift angle between one control position and the next following control position. It will thus be possible to assemble modules of identical construction such that their valve bodies are either in the same control position or in a different control position, whereas assembling them such that one or more cam control elements are in some in-between position, i.e., such that their valve bodies do not assume a precise control position, is reliably prevented.

Within the scope of the concept of the invention, other designs of the coupling devices for connecting together the cam control members are feasible if they will permit an assembly with an offset corresponding to the step intervals of the shift movement from one to another control position. We shall refer only for the sake of example in this regard to complementary spur gears or claw systems in the end faces of the cam control members, or disk-shaped intermediate pieces provided with wedge-like projections cooperating with individual grooves in the end faces, in the manner of an Oldenham coupling, in which the projections of the intermediate pieces provided on opposite sides are offset angularly from one another in the required manner.

If all or some of the individual modules are equipped with two valve bodies disposed in parallel spaced relationship to one another and designed for operation in opposite directions, the arrangement is made preferably such that the cam section of the cam control member acts directly on the projecting end of the one valve body, while the one free extremity of a two-arm lever engages the outer projecting end of the second valve body while the other end of said lever is acted upon by the cam section of the cam control member.

The invention will be further explained in the following description of an embodiment thereof, in conjunction with the appended drawings, wherein FIG. 1 is a side elevational view, simplified for ease of comprehension, through the upper part of a hydraulic three-position control valve provided with the actuating means of the invention, as seen in the direction of the arrows 1—1 of FIG. 2;

FIG. 2 is a front elevational view of the control valve shown in FIG. 1, composed of three single modules;

FIG. 3 is a diagrammatic representation of the cam control members of the individual modules of the control valve shown in FIGS. 1 and 2, in all three possible control positions, the said control members being joined together in different relative valve actuating positions;

Figure 4:
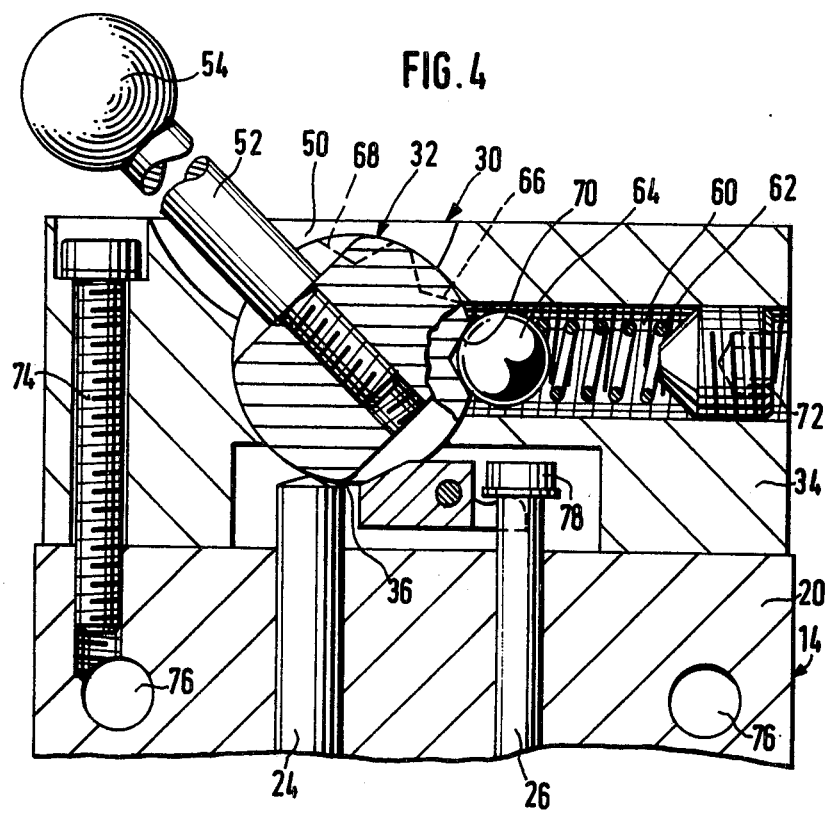
FIG. 4 is a detailed cross-sectional view corresponding to the cross section of FIG. 1, through the actuating means of the invention.

The three-position hydraulic control valve, designated as a whole by the numeral 10 in FIGS. 1 and 2, is composed in this instance of three single modules 12, 14 and 16 in each of whose directly assembled housings 18, 20 and 22 there are inserted, in a longitudinally displaceable manner, two control valve bodies 24 and 26 (FIGS. 1 and 4), of which only the upper extremities projecting from the module housing 20 are shown in FIGS. 1 and 4. Depending on their longitudinal position in the module housing, the control valve bodies bring about the opening or closing of passages or ports in the housing, thereby opening or closing a great variety of hydraulic connections to adjacent modules or external circuits. The internal construction of the modules, i.e., the design of the valve bodies and the arrangement of the passages or ports which they control is important to the operation of the actuating means of the invention only insofar as the individual modules are chiefly hydraulic modules whose hydraulic operation is designed to be relatively simple, and which, when assembled together with modules of identical or different but also relatively simple construction, can perform complex shifting and control functions. The individual modules are thus the smallest units of a modular system whereby any required hydraulic control valves can be assembled, it being also possible, of course, to incorporate into the modules hydraulic control elements which operate without external actuation, such as pressure limiting valves, alternating valves, check valves or the like.

What is essential to the invention, however, is the design of the actuating means 30 as a cam control device acting mechanically on the extremities of the valve bodies 24 and 26 projecting from the module housings 18 to 22, which has a cam control member 32 associated with each individual module 12, 14 and 16, and which is mounted for rotation over a given angular range within a cam housing 34 superimposed upon the corresponding module 12, 14 or 16 and has a central cam section 36 which can be brought into actuating engagement with one, both or neither of the extremities of the valve bodies 24 and 26, depending on its angular position. According to whether the valve body in question has to be pushed into the module housing for actuation or pulled out of same, the lobe of the cam section 36 acts directly on the particular extremity of the valve body (e.g., 24 in FIG. 1) or on the one end 38 of a two-arm lever 40 whose other end 42 engages the bottom of a head 78 at the end of the valve body (e.g., 26 in FIG. 1) and thus actuates it in the reverse direction. The embodiment shown in FIGS. 1 and 4, in the way in which the cam section 36 acts directly on the one valve body 24 and indirectly through the lever 40 on the other valve body, is a desirable one, but it can also be modified such that the cam section 36 acts directly on both valve bodies 24 and 26 or indirectly by means of direction-reversing levers on both valve bodies. In individual cases it is also conceivable that the module in question might have only one valve body to be operated by the cam control member.

The cam control members 32 are mounted by means of circular journals adjoining both sides of the cam section 36 in through-bores in the cam housings 34, and their external faces 44 are in each case congruous with the corresponding face of the cam control member 32 of the succeeding module. For the simultaneous synchronous actuation of the valve bodies 24 and 26 of the modules 12, 14 and 16 combined to form the control valve 10, the cam control members 32 of these modules can be coupled together for co-rotation. The coupling is formed in the present case by a series of grooves 46 offset each 45° from the other in the end faces 44, and intersecting one another at the axis of rotation of the cam control members 32, so that, as a whole, the grooves form the star-like configuration best seen in FIG. 5. By means of the flat key 48 inserted into one of the grooves 46 of each of the opposite end faces 44 (FIG. 2), the cam control members 32 are coupled together co-rotationally. Due to the offset angular arrangement of the grooves, a coupling of adjacent cam control members can be provided in steps of 45° or multiples thereof, so that modules can be coupled together with their control members in different actuation positions.

In at least one of the cam housings 34 there is provided an outwardly flaring groove 50 through which a control lever 52 bearing a ball knob 54 on its outer end is screwed into the cam control member 32. In the present case the groove 50 permits the control lever 52 to swing through an angle of 90°, a total of three control positions being provided, from "left" through "center" to "right".

FIG. 3 represents diagrammatically the angularly offset coupling of the cam control members 32 associated with the modules 12, 14 and 16, in the three possible control positions, a direct actuation by the lobe of cam section 36 of the right-hand valve body 26 being represented for the sake of simplification, even though this valve body is operated through the medium of the lever 40 in FIGS. 1 and 4, and it can be seen that the cam control member 32 of module 12 is offset by 90° from the cam control member of module 14 and the cam control member of module 16 is offset by 45° relative to the cam control member of module 14. The cam control members 32 of modules 12, 14 and 16 are so disposed that the cam section 36 of module 14, when in the "center" position, leaves both of the valve bodies 24 and 26 unactuated, while both of the corresponding valve bodies of module 12 are actuated, and only valve body 24 of module 16 is actuated. The valve body positions associated with the "left" and "right" position of control lever 52 are also visualized in FIG. 3. The valve bodies of each module are thus differently actuated in each position of the control lever 52. It is now apparent, therefore, that by coupling the cam control means together in different relative angular positions, the manner in which the valve bodies are operated can be changed, thus changing the function of the module. Even when modules of the same internal construction are used, control valves of different modes of operation can be assembled.

In FIG. 4, the module 14 is shown in cross section on an enlarged scale, with the actuating means 30 mounted thereon, for the purpose of explaining a number of additional details which cannot be understood from the intentionally simplified FIG. 1.

Thus, a detent means holding the cam control member in the adjustable actuating positions is shown, which has a spherical detent body 64 biased by a coil spring 62 in the direction of the cam control member 32, and mounted displaceably in a bore 60 in the cam housing 34. In each of the actuating positions, the detent body 64 is forced by the spring 62 into one of the detent notches 66, 68 or 70 in one of the journal sections of the cam control member 32 and thus holds the cam control member in position. A plug 72 screwed into the threaded emd of bore 60 can be driven more tightly in or out for the purpose of adapting the force of the detent means to various requirements.

The cam housing 34 is bolted to the module housing 20 by means of bolts 74 of which only one is shown in the drawing.

The two bores 76 shown on the right and left in the upper portion of the module housing 20 are through-bores which serve for joining module housing 20 to additional module housing by means of through-bolts or stays of sufficient length. It is apparent that, by means of these through-bores 76, not only can single modules be clamped together to form control valves of complex function, but also two or more control valves of independent function assembled in this manner can be clamped together into larger valve blocks.

Figure 5:
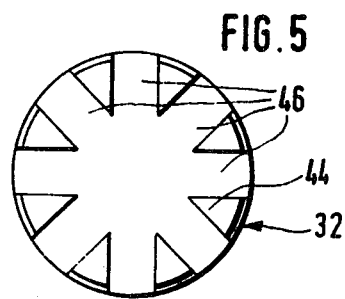
FIG. 5 is a view of one of the end faces of the cam control member of the actuating means represented in FIG. 4.

FIG. 5 shows the presently preferred arrangement of the grooves 46 in the end faces 44 of the cam control members, the swing from one actuating position to the next amounting to 45°. If the swing through the actuating positions requires greater or lesser rotations of the cam control member, the distribution of the grooves 46 is modified accordingly. Fundamentally, it would suffice if only one end surface of the cam control members 32 were provided in the manner shown with grooves offset from one another, while the other end face in each case would be provided with only one such groove aligning with the grooves of the faces with offset grooves in the same manner, which of the two end faces it is preferred to provide both end faces with offset grooves in the same manner, which has the additional advantage that, when the control is being assembled, there is no need to place the end faces in a particular position, since the cam control members are symmetrical. As previously stated, other coupling devices which permit a coupling of the cam control members in predetermined spacing with respect to one another can be provided within the scope of the invention.

I claim:

1. Mechanical actuating means for hydraulic control valves assembled from individual units in a modular system, each of said control valves having a module housing and valve bodies adapted to occupy at least two control positions, and having valve body ends projecting from the module housings on the same side, said actuating means for each module comprising a cam housing adapted to be placed on the module housing and having a cam control member rotatably mounted and rotatable about an axis of rotation in said cam housing and which is adapted to be brought into engagement with said ends of said valve bodies for controlling the positioning of same, the axes of all of said cam control members being aligned with each other, and a coupling for the co-rotational joining together of the cam control members of adjacent modules in selectable relative angular positions to one another.

2. Actuating means according to claim 1, wherein each control member of each individual module has in its central area a cam section engaging said ends of the valve bodies depending on its angular position, and journal portions of circular cross section adjoining said cam section laterally for rotatable mounting in said cam housing.

3. Actuating means according to claim 2, comprising a detent body displaceably mounted in the cam housing of at least one module of a series of modules, means for resiliently biasing said detent body towards a journal portion of said cam control member, said cam control member having one detent recess each in those areas thereof which are opposite the detent body in the control positions.

4. Actuating means according to claim 1, comprising a slot disposed at right angles to the axis of rotation of the cam control member and provided in the cam housing of one module of a series of modules, a control lever fastened to said cam control member, and protruding from the cam housing and passing through said slot, the length and shape of said slot in its end area being such that the cam control member may be rotated by said lever to the control positions.

5. Actuating means according to claim 1, wherein said couplings are formed by grooves created in the confronting end faces of the adjacent cam control members, into which grooves a key may be inserted to bridge the interval therebetween.

6. Actuating means according to claim 5, comprising a plurality of angularly offset grooves in the end faces of said cam control members, the number of said grooves depending on the number of said control positions, said grooves being offset so as to correspond in angle to the relative angular positions of the cam control members in said cam housing, associated with said control positions.

7. Actuating means according to claim 6 for a two-position control valve, wherein the cam control members perform a rotatory movement of 90° in shifting from one to the other control position, and wherein in each of the end faces of adjacent cam control members there are provided two grooves extending at right angles to one another and intersecting on the axis of rotation of the corresponding cam control member.

8. Actuating means according to claim 6 for a three-position control valve, in which the cam control members, in shifting from one end position through a center position to another end position, perform a rotatory movement of 90°, and wherein, in the end faces of adjacent cam control members a total of four grooves are provided, which are offset each by 45° from one another and intersect at the axis of rotation of the corresponding cam control member.

9. Actuating means according to claim 1 for individual modules having two valve bodies disposed parallel at a distance from one another, wherein said cam section of said cam control member acts directly on the end of the one valve body, and comprising a two-arm lever having a free end engaging the end of the other valve body, the cam section of the cam control member acting on the other end of said two-arm lever.

* * * * *